(12) United States Patent
Kao et al.

(10) Patent No.: US 7,572,997 B2
(45) Date of Patent: Aug. 11, 2009

(54) EDM PROCESS FOR MANUFACTURING REVERSE TAPERED HOLES

(75) Inventors: Chen Chun Kao, East Peoria, IL (US); Marion Billingsley Grant, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 246 days.

(21) Appl. No.: 11/711,722

(22) Filed: Feb. 28, 2007

(65) Prior Publication Data

US 2008/0203069 A1 Aug. 28, 2008

(51) Int. Cl.
*B23H 1/00* (2006.01)
*B23H 9/14* (2006.01)

(52) U.S. Cl. .................................. 219/69.17; 205/665

(58) Field of Classification Search ............. 219/69.11, 219/69.13, 69.17, 69.18; 205/665
See application file for complete search history.

(56) References Cited

U.S. PATENT DOCUMENTS

| 4,069,978 | A |   | 1/1978  | El Moussa |           |
|-----------|---|---|---------|-----------|-----------|
| 4,361,745 | A | * | 11/1982 | Rupert et al. | 219/69.13 |
| 4,487,671 | A | * | 12/1984 | McGeough  | 219/69.17 |
| 4,566,634 | A |   | 1/1986  | Wiegand   |           |
| 5,016,820 | A |   | 5/1991  | Gaskell   |           |
| 5,029,759 | A |   | 7/1991  | Weber     |           |
| 5,092,039 | A |   | 3/1992  | Gaskell   |           |
| 5,109,823 | A |   | 5/1992  | Yokoyama et al. |     |
| 5,163,621 | A |   | 11/1992 | Kato et al. |         |
| 5,353,992 | A |   | 10/1994 | Regueiro  |           |
| 5,359,169 | A |   | 10/1994 | Kaneko et al. |       |
| 5,636,796 | A |   | 6/1997  | Oguma     |           |
| 5,685,971 | A |   | 11/1997 | Schroder et al. |     |
| 5,904,865 | A |   | 5/1999  | Jariabek  |           |
| 5,934,571 | A |   | 8/1999  | Schmidt et al. |      |
| 5,992,766 | A |   | 11/1999 | Hofmann   |           |
| 6,019,296 | A |   | 2/2000  | Yamamoto et al. |     |
| 6,070,811 | A |   | 6/2000  | Takeda et al. |       |
| 6,130,395 | A |   | 10/2000 | Kaneko et al. |       |

(Continued)

FOREIGN PATENT DOCUMENTS

EP 0495985 7/1992

(Continued)

OTHER PUBLICATIONS

C. Diver et al., *Micro-EDM drilling of tapered holes for industrial applications*, Journal of Materials Processing Technology 149 (2004) 296-303.

*Primary Examiner*—Geoffrey S Evans
(74) *Attorney, Agent, or Firm*—Finnegan, Henderson, Farabow, Garrett & Dunner

(57) ABSTRACT

A electrical discharge machining apparatus is disclosed. The apparatus may have an electrode, an actuator configured to advance the electrode, and a power supply. The apparatus may also have a controller in communication with the actuator and the power supply. The controller may be configured to negatively charge the electrode, and regulate the actuator to advance the negatively charged electrode toward a positively charged workpiece, thereby initiating erosion of the positively charged workpiece. The controller may also be configured to positively charge the electrode and negatively charge the workpiece to erode the electrode to a desired condition after workpiece erosion has been initiated. The controller may also be configured to continue advancing the electrode toward the workpiece after the electrode has been eroded to the desired condition.

6 Claims, 2 Drawing Sheets

U.S. PATENT DOCUMENTS

| | | | |
|---|---|---|---|
| 6,142,392 A | 11/2000 | Takeda et al. | |
| 6,161,781 A | 12/2000 | Kojima et al. | |
| 6,378,792 B2 | 4/2002 | Fukaya et al. | |
| 6,439,484 B2 | 8/2002 | Harata et al. | |
| 6,502,769 B2 | 1/2003 | Imoehl | |
| 6,520,145 B2 | 2/2003 | Hunkert | |
| 6,626,381 B2 | 9/2003 | Parrish | |
| 6,642,477 B1 * | 11/2003 | Patel et al. | 219/121.71 |
| 6,644,565 B2 | 11/2003 | Hockenberger | |
| 6,676,048 B1 | 1/2004 | Tiemann | |
| 6,678,955 B2 | 1/2004 | Takeshita et al. | |
| 6,708,905 B2 | 3/2004 | Borissov et al. | |
| 6,783,085 B2 | 8/2004 | Xu | |
| 6,817,545 B2 | 11/2004 | Xu | |
| 6,826,833 B1 | 12/2004 | Maier et al. | |
| 6,848,635 B2 | 2/2005 | Xu | |
| 6,892,962 B2 | 5/2005 | Hurley et al. | |
| 6,903,297 B2 | 6/2005 | Goto et al. | |
| 6,948,665 B2 | 9/2005 | Joseph | |
| 6,978,948 B2 | 12/2005 | Heinecke | |
| 7,011,257 B2 | 3/2006 | Heyse | |
| 7,051,957 B1 | 5/2006 | Goenka et al. | |
| 7,059,549 B2 | 6/2006 | Xu | |
| 7,086,615 B2 | 8/2006 | Joseph | |
| 7,124,963 B2 | 10/2006 | Goenka et al. | |
| 7,128,282 B2 | 10/2006 | Okamoto et al. | |
| 7,137,576 B2 | 11/2006 | Xu | |
| 7,137,577 B2 | 11/2006 | Goenka et al. | |
| 7,159,802 B2 | 1/2007 | Oomura et al. | |
| 7,168,637 B2 | 1/2007 | Goenka et al. | |
| 2001/0017325 A1 | 8/2001 | Harata et al. | |
| 2002/0008166 A1 | 1/2002 | Fukaya et al. | |
| 2002/0113042 A1 | 8/2002 | Masaki et al. | |
| 2003/0141385 A1 | 7/2003 | Xu | |
| 2004/0046063 A1 | 3/2004 | Heyse | |
| 2004/0163254 A1 | 8/2004 | Miyagawa et al. | |
| 2004/0178287 A1 | 9/2004 | Okamoto et al. | |
| 2004/0262430 A1 | 12/2004 | Joseph | |
| 2005/0017098 A1 | 1/2005 | Joseph | |
| 2005/0023381 A1 | 2/2005 | Xu | |
| 2005/0116066 A1 | 6/2005 | Fath | |
| 2006/0022070 A1 | 2/2006 | Knol et al. | |
| 2006/0049286 A1 | 3/2006 | Oomura et al. | |
| 2006/0097075 A1 | 5/2006 | Goenka et al. | |
| 2006/0097078 A1 | 5/2006 | Goenka et al. | |
| 2006/0097079 A1 | 5/2006 | Goenka et al. | |
| 2006/0097081 A1 | 5/2006 | Goenka et al. | |
| 2006/0097087 A1 | 5/2006 | Goenka et al. | |

FOREIGN PATENT DOCUMENTS

| | | | |
|---|---|---|---|
| GB | 2262253 A | * | 6/1993 |
| JP | 3-196916 A | * | 8/1991 |
| WO | WO 2005/107988 | | 11/2005 |

* cited by examiner

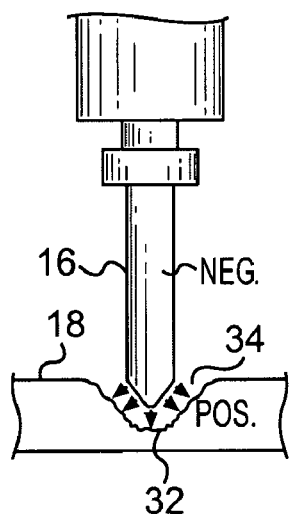 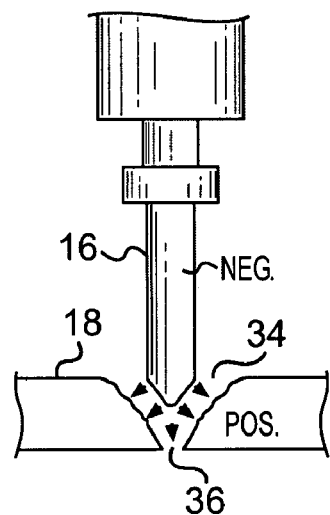
FIG. 2A    FIG. 2B
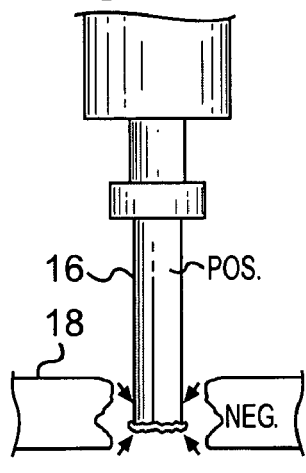 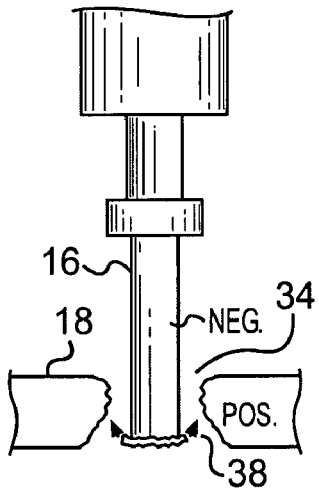
FIG. 2C    FIG. 2D
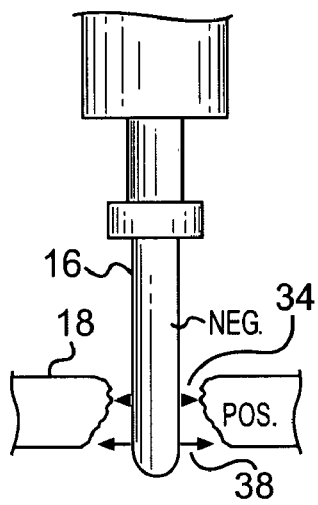
FIG. 2E

EDM PROCESS FOR MANUFACTURING REVERSE TAPERED HOLES

TECHNICAL FIELD

The present disclosure relates to an Electrical Discharge Machining (EDM) process and, more particularly, to an EDM process for manufacturing reverse tapered holes.

BACKGROUND

Electrical Discharge Machining is a process by which conductive particles are removed from the surface of a positively charged workpiece by a series of discharges emanating from a negatively charged electrode. The electrical discharges or sparks create micro-craters on the workpiece by removing material along the cutting path through melting and vaporization. The particles are then washed away by a continuously flushing dielectric fluid. EDM is typically used to create very small and accurate holes having generally straight walls. One common application for EDM is in the fabrication of fuel injector nozzles having one or more injection orifices.

It has recently been recognized that a reverse taper in the orifice of a fuel injector tip (i.e., a generally conically-shaped hole originating from a larger diameter at an internal surface the injector tip and terminating at a smaller diameter at an external surface of the injector tip) improves injection flow characteristics. Although EDM has been used to produce injection orifices in the past, the orifices produced by EDM were limited to straight walls (i.e., walls without significant taper). Therefore, a new process was required to produce the desired reverse taper.

One EDM process utilized to produce reverse tapered holes is described in an article by Diver et al. entitled "Micro-EDM drilling of tapered holes for industrial applications" published in the Journal of Materials Processing Technology Vol. 149, pages 296-303 (2004). This article describes a process in which an electrode is presented to a workpiece at an angle parallel with an angle of a desired taper. As the electrode is charged and fed toward the workpiece, the electrode is rotated about a vertical axis such that a spiraling cutting trajectory is formed. That is, as the electrode is rotated, its angle allows the electrode to cut an internal annular swath of the workpiece. As the rotated electrode is advanced toward the workpiece, a cone shape is achieved with the increasing depth and diameter of cut.

Although the process outlined in the above-identified article may be capable of producing the required taper, it may be complex, expensive, time consuming, and insufficiently accurate. Specifically, additional components must be added to the typical EDM apparatus to produce the angled rotation of the electrode. Similarly, additional control mechanisms must be utilized to regulate the motion of the rotating components. These extra components and control mechanisms increase the complexity and cost of the EDM apparatus. In addition, because only one annular segment of the taper's diameter is being cut at a time (i.e., the electrode must be rotated 360° to cut an entire periphery of the taper at a given depth), the time require to produce the entire tapered cut may be significantly more than the time required to produce a straight cut where the entire periphery at a single depth is simultaneously cut. Further, the process outlined above may require a greater electrode length. The greater electrode length, combined with the cantilevered angle, may allow for greater vibration in the electrode that could produce inconsistencies in the taper.

The present disclosure is directed to overcoming one or more of the shortcomings set forth above.

SUMMARY OF THE INVENTION

In one aspect, the present disclosure is directed to an electrical discharge machining apparatus. The apparatus may include an electrode, an actuator configured to advance the electrode, and a power supply. The apparatus may also include a controller in communication with the actuator and the power supply. The controller may be configured to negatively charge the electrode, and regulate the actuator to advance the negatively charged electrode toward a positively charged workpiece, thereby initiating erosion of the positively charged workpiece. The controller may also be configured to positively charge the electrode and negatively charge the workpiece to erode the electrode to a desired condition after workpiece erosion has been initiated. The controller may also be configured to continue advancing the electrode toward the workpiece after the electrode has been eroded to the desired condition.

In another aspect, the present disclosure is directed to a method of fabricating a reverse tapered hole in a workpiece. The method may include negatively charging an electrode, and advancing the negatively charged electrode toward a positively charged workpiece, thereby initiating erosion of the positively charged workpiece. The method may further include positively charging the electrode and negatively charging the workpiece to erode the electrode to a desired condition after workpiece erosion has been initiated. The method also may include continuing advancement of the electrode toward the workpiece after the electrode has been eroded to the desired condition.

BRIEF DESCRIPTION OF THE DRAWINGS

FIGS. 2A-2E illustrate exemplary disclosed steps of operation associated with the EDM apparatus of FIG. 1.

DETAILED DESCRIPTION

Figure 1:
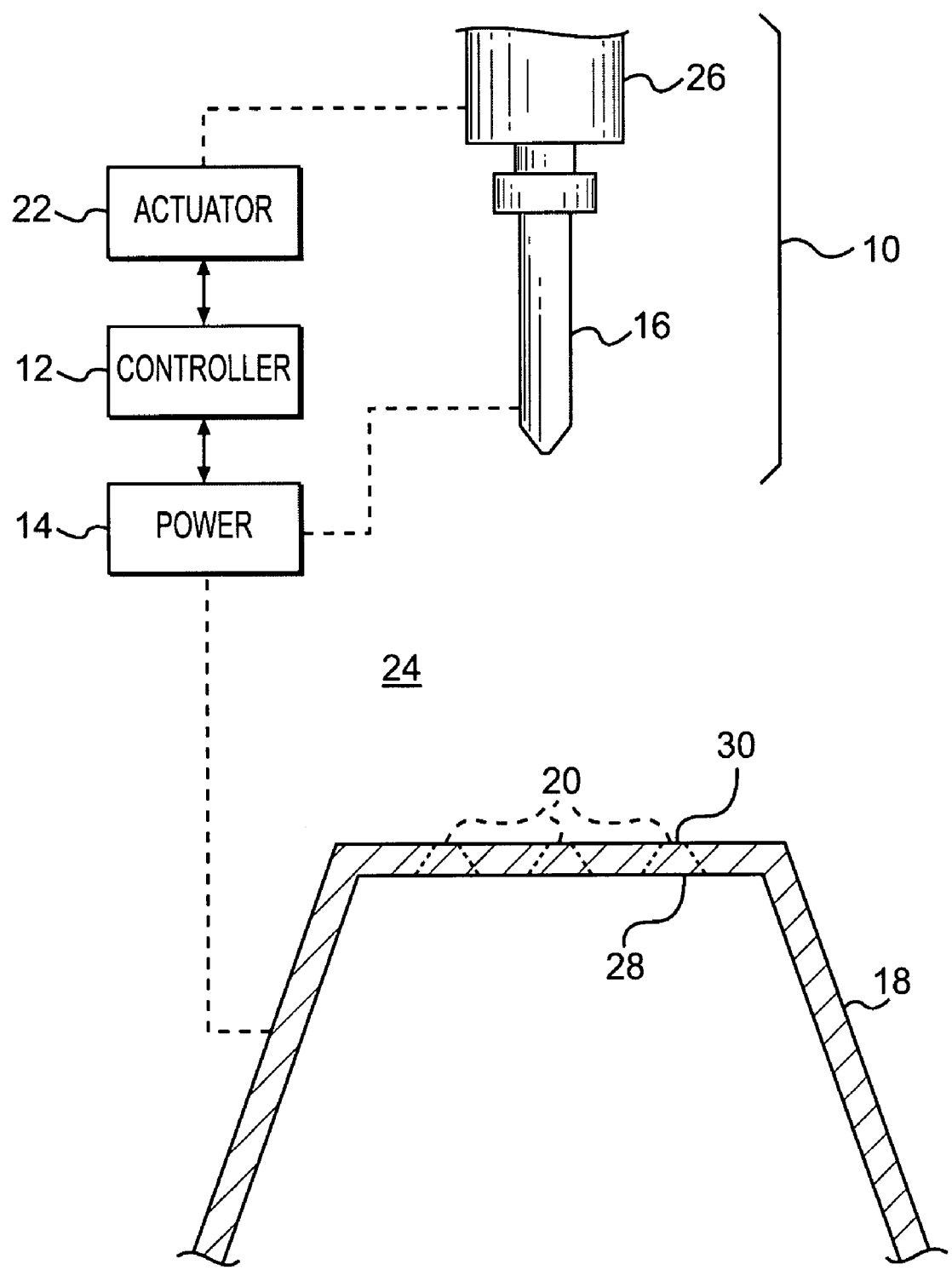
FIG. 1 is a diagrammatic illustration of an exemplary disclosed EDM apparatus.

An Electrical Discharge Machining ("EDM") apparatus and EDM process are disclosed herein. FIG. 1 illustrates an EDM apparatus 10. EDM apparatus 10 may be any type of known EDM apparatus, and more specifically, may be an EDM apparatus having a standard combination of physical components. For example, EDM apparatus may be what is commonly referred to as a "die-sinking", plunge, or vertical-type EDM apparatus. As illustrated in FIG. 1, EDM apparatus 10 may include a power supply 14, an actuator 22, a collet 26, an electrode 16, a workpiece retainer (not shown), and a controller 12.

Power supply 14 may be any type of power supply that is capable of providing a variable supply of power, such as a battery, an AC power supply, or a DC power supply, such as a linear power supply, switching power supply, DC-DC converter, or silicon controlled rectifier (SCR). Power supply 14 may be connected to electrode 16 and a workpiece 18 via electrically conductive wires. Power supply 14 may, thereby, provide opposing charges to electrode 16 and to workpiece 18. For example, power supply 14 may negatively charge electrode 16 while positively charging workpiece 18 via the workpiece retainer. Alternatively, power supply 14 may negatively charge workpiece 18 while positively charging electrode 16. Thus, depending on a desired set of conditions, power supply 14 may alter the polarity, current, and voltage directed to each of electrode 16 and workpiece 18.

Actuator 22 may engage and advance electrode 16, as desired. Actuator 22 may be any type of linear actuator, such as, for example, a mechanical linkage, power screw, hydraulic cylinder, piezoelectric servo, or other electromechanical actuator. Alternatively, actuator 22 may be a multi-axis positioning system configured to move electrode 16 in a XYZ coordinate system. It is further contemplated that actuator 22 may rotate electrode 16 in one or more directions. Actuator 22 may therefore advantageously advance electrode 16 in a desired direction, such as towards and away from the workpiece 18. Actuator 22 may engage electrode 16 by way of collet 26.

Collet 26 may support electrode 16 by any suitable means. For example, collet 26 may be a round, hexagonal, or square collet. Collet 26 may have a correspondingly shaped annular member and a central void that is at least slightly larger in diameter than the diameter of electrode 16 such that collet 26 may readily accept the electrode 16. Collet 26 may have a plurality of slots in the annular member surrounding the void to allow inward deformation for grasping electrode 16. Collet 26 may include one or more threads on one end for engaging EDM apparatus 10 such that positive engagement of the thread or threads enacts a locking deformation of the collet 26 around electrode 16.

Electrode 16 may be any type of suitable electrode such as a hollow or solid electrode. In one embodiment, electrode 16 is a uniformly cylindrical probe, except where it tapers to a point at an end opposite from its engagement with collet 26. Electrode 16 may also be bent, or otherwise shaped in a manner advantageous to the desired material removal. Electrode 16 may be made of any suitable material such as graphite or metals including brass, copper, zinc, tungsten, or aluminum. Electrode 16 may also be made of an alloy, such as, for example, copper-tungsten, silver-tungsten, low-carbon steel, and stainless steel. Alternatively, electrode 16 may also be made from any type of composite material or ceramic compound, such as silicon carbide. In one embodiment, a metal electrode 16 may be made by powder metallurgy techniques, which include, for example, pressing, sintering and infiltrating tungsten with copper or silver. In another embodiment, a graphite electrode 16 may be fabricated by grinding, milling, or turning a graphite blank into a suitably shaped electrode.

Workpiece 18 may be retained through any traditionally employed methods such as by clamping with a vise or other suitable clamp, so long as it is retained sufficiently immobile to obtain desirable EDM machined tolerances. It is further desirable that workpiece 18 be retained in a manner that sufficiently reduces vibration and other disturbances. Workpiece 18 may also be in communication with power supply 14 by one or more electrically conductive wires. Workpiece 18 also may be in electrically conductive communication with power supply 14 via the workpiece retainer. In one embodiment, workpiece 18 may be an injector nozzle of a fuel injector for a diesel fuel engine. Alternatively, workpiece 18 may be a turbine blade or any other component benefiting from a reverse tapered hole.

Workpiece 18 may be in contact with a dielectric fluid 24. Dielectric fluid 24 may also be in common contact with electrode 16 such that a space between workpiece 18 and electrode 16 is advantageously insulated. Dielectric fluid 24 may be any type of traditionally acceptable dielectric fluid, such as oil or de-ionized water.

Controller 12 may embody a single microprocessor or multiple microprocessors that include a means for controlling an operation of EDM apparatus 10 and/or the power supply 14. Numerous commercially available microprocessors may perform the functions of controller 12. It should be appreciated that controller 12 could readily embody a general machine microprocessor capable of controlling numerous machine functions. Controller 12 may include, or be associated with, a memory for storing data such as, for example, an operating condition, design limit, and performance characteristic or specification of EDM apparatus 10 and/or power supply 14. In particular, controller 12 may include a memory for storing one or more predetermined variables or thresholds. Various other known circuits may be associated with controller 12, including power supply circuitry, signal-conditioning circuitry, solenoid driver circuitry, communication circuitry, and other appropriate circuitry. Moreover, because controller 12 may communicate with other components via either wired or wireless transmission, controller 12 may be disposed in a location remote from EDM apparatus 10, if desired.

Controller 12 may be in communication with the actuator 22 of EDM apparatus 10 and the power supply 14. Therefore, controller 12 may control a linear advancement of actuator 22. Controller 12 may also apply a particular charge to each of electrode 16 and workpiece 18 via control of power supply 14. For example, under a traditional small discharge energy setup, controller 12 may instruct power supply 14 to negatively charge electrode 16 to around 180-200 Volts at about 10 amps.

Controller 12 may vary the amount of power conveyed through electrode 16 and move actuator 22 according to the methods disclosed herein to create a specific geometry of through-holes in workpiece 18. Specifically, controller 12 may cause power supply 14 to switch the polarity of charge to electrode 16 and workpiece 18 such that electrode 16 becomes positively charged and workpiece 18 is negatively charged. Controller 12 may also cause power supply 14 to increase an applied charge to electrode 16 and/or workpiece 18 under traditional EDM conditions, but with a large discharge energy setup. Specifically, controller 12 may cause the output from power supply 14 to be increased to around 240 Volts at about 12-13 amps. Controller 12 may also cause actuator 22 to plunge electrode 16 to a distance at which the end of electrode 16 has passed all the way through the workpiece 18 and past the inner surface of the workpiece 18 (over-feeding), such as by about 0.5 mm.

As illustrated, EDM apparatus 10 may act on workpiece 18 to create a plurality of reverse tapered holes 20. Reverse tapered holes 20 may be in the range of 100 to 500 μm in diameter. Reverse tapered holes 20 may have any contemplated variations in diameter sufficient for generating a plurality of suitable fuel sprays. In one embodiment of holes 20, an inner diameter 28 may be larger than an outer diameter 30. For example, in a reverse tapered hole having a diameter on the order of 200 μm, the difference in diameter between the inner spray hole diameter 28 and outer spray hole diameter 30 of tapered holes 20 may be approximately 20 μm. Accordingly, reverse tapered holes 20 may be able to generate a desirable spray of a liquid, such as a fuel, through workpiece 18.

FIGS. 2A-E depict steps of a reverse taper fabrication process. FIGS. 2A-E will be described in detail in the following section to better illustrate the disclosed system and its operation.

INDUSTRIAL APPLICABILITY

The disclosed method and apparatus may be applicable to producing reverse tapered micro-holes, such as for use in diesel fuel injection nozzles and turbine blades. In particular, the disclosed method and apparatus may be applicable for use in efficiently manufacturing reverse tapered holes having increased coefficients of discharge and reduced likelihood of cavitation. Such reverse tapered holes may provide more durable and consistent nozzle performance, which is advantageous in the pursuit of sustainable low-level emissions. The operation of EDM apparatus 10 will now be described.

Referring now to FIG. 2A, during an initial penetration of workpiece 18, controller 12 may instruct power supply 14 to charge electrode 16 and workpiece 18 under traditional EDM polarity (i.e., wherein electrode 16 is negatively charged and workpiece 18 is positively charged). In this initial process, referred to as "pecking", a pilot hole may be drilled under a small discharge energy setup, wherein the output from power supply 14 may be around 180-200 Volts at about 10 amps. During this small discharge energy setup, actuator 22 may be advanced to drive electrode 16 downwards, toward workpiece 18. As electrode 16 plunges through the first, or external, two-thirds of a workpiece thickness, a standard tapered hole may be formed through the first two-thirds of the workpiece thickness (i.e., where an inner spray hole diameter 32, at an internal surface of the workpiece, is smaller than an outer spray hole diameter 34, at an external surface of the workpiece).

As illustrated in FIG. 2B, the pilot hole may be drilled all the way through the workpiece 18, but just enough to create a breakout hole 36 on an internal face of the nozzle opening. Breakout hole 36 may be just large enough to allow the passage of dielectric fluid for preventing secondary discharge of accumulated debris during subsequent stages of the disclosed process. For example, breakout hole 36 may be very small, such as, around 100 μm.

During the pecking steps (2A, 2B), under a traditional EDM configuration, the initial standard taper erosion of workpiece 18 may cause lateral wear, or "sharpening", of electrode 16. More specifically, such naturally occurring, lateral "usage" wear of the tip of electrode may result in the tip becoming narrower at its very end. Thus, as electrode 16 penetrates workpiece 18 as illustrated in FIGS. 2A and 2B, a tip of electrode 16 may become slightly sharper. In one embodiment, the tip of electrode 16 may have been "sharpened" by the machining of a previously penetrated hole 20. For example, EDM apparatus 10 may be operated to drill pilot holes for a desired number of reverse tapered holes 20 prior to performing the reverse polarity operations. This sharpened tip may allow the drilling of smaller diameter pilot holes to provide advantageously smaller outer spray hole diameters at the external surface of workpiece 18.

Once a pilot hole has been formed in workpiece 18, electrode 16 may be positioned about halfway through workpiece 18, as illustrated in FIG. 2C, in preparation for "barreling" of the workpiece. At this location, controller 12 may reverse the polarity of electrode 16 and workpiece 18 such that workpiece 18 is now negatively charged and electrode 16 is now positively charged. Thus, under these reversed conditions, workpiece 18 may now erode electrode 16 as if it were an electrode itself. Because a concentration of eroding energy at the tip of electrode 16 may cause near melting conditions, the tip may become enlarged, or "mushroomed", as illustrated in FIG. 2C.

This reversed polarity may also be conducive to a controlled "arcing" phenomenon in which workpiece 18 is also eroded in addition to electrode 16. This controlled "arcing" condition may cause localized bombardment of the middle of workpiece 18 with charged plasma, sufficient to result in a significant level of material removal. Such a level of material removal, under these reversed polarity conditions, may result in a "barreled" hole profile, as seen in the middle of workpiece 18, in FIG. 2C.

Once the reversed polarity step has sufficiently "mushroomed" electrode 16 and sufficiently "barreled" the middle of workpiece 18, controller 12 may return the polarity output of power supply 14 to that of a traditional EDM apparatus, wherein electrode 16 is negatively charged and workpiece 18 is positively charged. Moreover, controller 12 may increase the output from power supply 14 to that of a large discharge energy setup. Specifically, the power output may be increased to around 240 Volts at about 12-13 amps. Under these conditions, controller 12 may regulate actuator 22 to continue advancement of electrode 16 through the remaining one-third of workpiece 18.

As illustrated in FIG. 2D, actuator 22 may advance electrode 16 to plunge all the way through the inner or final one-third of workpiece 18 to create the desired reverse tapered hole. Because the electrode tip is mushroomed, and because the output from power supply 14 has been increased to a large energy discharge condition, there may be aggressive material removal during the remainder of the plunging. Thus, the hole diameter 38 of the inner one-third of workpiece 18 may be opened-up to a greater degree than the outer spray hole diameter 34, which was machined under small energy discharge conditions with a sharpened electrode 16.

As illustrated in FIG. 2E, actuator 22 may advance electrode 16 all the way through the breakout hole 36 created in the inside face of the nozzle opening during the initial pecking step. Actuator 22 may advance electrode 16 even farther, to overfeed electrode 16 slightly past the inside face of the nozzle opening such that sparks may also be emitted radially from the side of electrode 16 instead of only the tip. Because sparks may be emitted radially from the side of electrode 16, there may be even greater opening up of the hole 38 near the inside face of the nozzle opening. In one embodiment, controller 12 and actuator 22 may over-feed electrode 16 by about 0.3 to 0.5 mm past the interior surface of the workpiece. The above steps may advantageously result in a hole wherein the outer two-thirds of the hole are substantially cylindrical, and the inner one-third of the hole is substantially conical (i.e., reverse tapered).

Moreover, as illustrated in FIG. 2E, the large energy discharge plunging of the inner one-third of the workpiece, under traditional EDM polarity, may result in gradual re-sharpening of electrode 16 in a manner similar to that occurring in the initial pecking step. Specifically, squared, cylindrical edges of the "mushroomed" electrode 16 may be dulled to create a rounded off, but more pointed tip. Accordingly, after electrode 16 has machined a reverse tapered hole according to the aforementioned process, it may have been at least partially re-sharpened in preparation for a pecking step on a subsequently machined hole.

The present EDM apparatus and method may reliably and advantageously create reverse tapered injector nozzle spray holes that may result in more durable nozzles and consistently low emissions. Because traditional EDM equipment may be used to perform this method, the present disclosure provides numerous advantages, including, for example, the suitability of traditional EDM parts, the applicability of already known repair methods, and other associated reductions in implementation costs. Moreover, because electrode 16 may be driven linearly straight downwards, fewer complex control and motion mechanisms are required, and shorter electrodes may be used. The rate of material removal may also be advantageously maximized as compared to annularly advanced electrodes.

It will be apparent to those skilled in the art that various modifications and variations can be made to the disclosed EDM apparatus and method. Other embodiments will be apparent to those skilled in the art from consideration of the specification and practice of the disclosed apparatus and method. It is intended that the specification and examples be considered as exemplary only, with a true scope being indicated by the following claims and their equivalents

What is claimed is:

1. A method of fabricating a reverse tapered hole in a workpiece, the method comprising:
    negatively charging an electrode;
    advancing the negatively charged electrode toward a positively charged workpiece, thereby initiating erosion of the positively charged workpiece;
    positively charging the electrode and negatively charging the workpiece to erode the electrode to a desired condition after workpiece erosion has been initiated; and
    continuing advancement of the electrode toward the workpiece after the electrode has been eroded to the desired condition.

2. The method of claim 1, further including positively charging the workpiece and negatively charging the electrode after the electrode has been eroded to the desired condition and before continuing advancement of the electrode.

3. The method of claim 2, wherein:
    the desired condition includes a tip of the electrode having a diameter greater than a shaft diameter of the electrode; and
    continuing advancement results in the formation of a hole having a reverse taper in the workpiece.

4. The method of claim 1, wherein:
    a hole depth of about two-thirds of a desired total hole depth within the workpiece is achieved before intentional erosion of the electrode occurs;
    erosion of the first two-thirds of the desired total hole depth is performed at a first power level; and
    erosion of the remaining one-third of the desired total hole depth is performed at a second greater power level.

5. The method of claim 1, further including overfeeding the electrode past an internal opening of a resulting hole.

6. The method of claim 1, wherein a tip of the electrode is sharpened prior to erosion initiation of the workpiece.

* * * * *